(12) United States Patent
Chung et al.

(10) Patent No.: US 11,954,694 B2
(45) Date of Patent: Apr. 9, 2024

(54) PLATFORM AND METHOD FOR CALCULATING PAYMENT, CONTRIBUTION, INVESTMENT AND DIVIDEND RETURN OF CARBON EMISSION CHARGES BASED ON BLOCKCHAIN

(71) Applicants: Rae Kwon Chung, Seoul (KR); Ji Eun Lee, Seoul (KR)

(72) Inventors: Rae Kwon Chung, Seoul (KR); Ji Eun Lee, Seoul (KR)

(73) Assignees: Rae Kwon Chung, Seoul (KR); Sang Hyun Shin, Seoul (KR)

( * ) Notice: Subject to any disclaimer, the term of this patent is extended or adjusted under 35 U.S.C. 154(b) by 0 days.

(21) Appl. No.: 17/665,387

(22) Filed: Feb. 4, 2022

(65) Prior Publication Data
US 2022/0343338 A1 Oct. 27, 2022

(30) Foreign Application Priority Data
Apr. 26, 2021 (KR) .......................... 10-2021-0053986

(51) Int. Cl.
*G06Q 30/018* (2023.01)
*G06Q 20/38* (2012.01)
(Continued)

(52) U.S. Cl.
CPC ........... *G06Q 30/018* (2013.01); *G06Q 40/06* (2013.01); *H04L 9/0637* (2013.01);
(Continued)

(58) Field of Classification Search
CPC .............................. G06Q 40/00; G06Q 40/06
(Continued)

(56) References Cited

U.S. PATENT DOCUMENTS 5,687,968 A * 11/1997 Tarantino ................ A63F 3/081
 463/16
6,098,051 A * 8/2000 Lupien .................... G06Q 40/08
 705/30

(Continued)

FOREIGN PATENT DOCUMENTS

KR 10-1914576 B1 11/2018
WO WO 2019/094828 A1 5/2019

OTHER PUBLICATIONS

European Patent Application No. 22159814.7; Extended Search Report; dated Sep. 26, 2022; 9 pages.

*Primary Examiner* — Kirsten S Apple
(74) *Attorney, Agent, or Firm* — Studebaker & Brackett PC (57) ABSTRACT

The present disclosure relates to a blockchain based platform and a method for consumers to invest in climate related financial products at an amount voluntarily chosen based on a calculation of carbon emission amount from the transactions data crawled from the servers of financial institutions that operates credit and cash cards and to return the principal investment and dividends accrued from the climate related investments options to the consumers who paid the voluntarily chosen amount of carbon emission charges of their consumption of goods and services.

The platform embodied in the present disclosure provides an incentive for consumers to voluntarily pay their carbon emission charges by financially intermediating voluntary carbon emission payment into climate related investment options and a blockchain based security of transactions for the return of the principal investments and dividends accrued from the climate related financial products to those consumers who voluntarily paid carbon emission charges.

13 Claims, 8 Drawing Sheets

(51) Int. Cl.
*G06Q 40/06* (2012.01)
*H04L 9/06* (2006.01)

(52) U.S. Cl.
CPC ............ *G06Q 20/389* (2013.01); *Y02P 70/00* (2015.11); *Y02P 90/82* (2015.11)

(58) Field of Classification Search
USPC .................................................. 705/35, 38
See application file for complete search history.

(56) References Cited

U.S. PATENT DOCUMENTS

| | | | | |
|---|---|---|---|---|
| 6,272,474 B1* | 8/2001 | Garcia | ................ | G06T 11/206 |
| | | | | 705/36 R |
| 6,278,982 B1* | 8/2001 | Korhammer | .......... | G06Q 40/06 |
| | | | | 705/36 R |
| 6,356,911 B1* | 3/2002 | Shibuya | ............ | G01C 21/3446 |
| | | | | 707/999.005 |
| 6,721,715 B2* | 4/2004 | Nemzow | ............... | G06Q 40/00 |
| | | | | 705/41 |
| 7,062,361 B1* | 6/2006 | Lane | ...................... | F25D 29/00 |
| | | | | 700/291 |
| 7,130,789 B2* | 10/2006 | Glodjo | .................. | G06Q 40/06 |
| | | | | 705/37 |
| 7,315,840 B1* | 1/2008 | Keith | .................... | G06Q 40/00 |
| | | | | 705/37 |
| 7,392,213 B2* | 6/2008 | Merkoulovitch | ...... | G06Q 40/08 |
| | | | | 705/36 R |
| 7,831,494 B2* | 11/2010 | Sloan | .................... | G06Q 40/08 |
| | | | | 705/37 |
| 8,073,763 B1* | 12/2011 | Merrin | .................. | G06Q 40/04 |
| | | | | 705/37 |
| 8,126,794 B2* | 2/2012 | Lange | ................... | G06Q 40/04 |
| | | | | 705/36 R |
| 8,359,260 B2* | 1/2013 | Merrin | .................. | G06Q 40/04 |
| | | | | 705/37 |
| 8,417,618 B2* | 4/2013 | Milne | ................... | G06Q 40/04 |
| | | | | 705/37 |
| 8,755,943 B2* | 6/2014 | Wenzel | .................... | F24F 11/58 |
| | | | | 165/238 |
| 10,861,112 B2 | 12/2020 | Forbes, Jr. et al. | | |
| 10,902,484 B1* | 1/2021 | Pepere | ................. | G06Q 20/145 |
| 11,341,490 B2* | 5/2022 | Jawaharlal | ......... | G06Q 10/0639 |
| 2002/0147671 A1* | 10/2002 | Sloan | ..................... | G06Q 40/00 |
| | | | | 705/36 R |
| 2002/0147675 A1* | 10/2002 | Das | ........................ | G06Q 30/08 |
| | | | | 705/37 |
| 2002/0194099 A1* | 12/2002 | Weiss | ..................... | G06Q 40/06 |
| | | | | 705/36 R |
| 2003/0182224 A1* | 9/2003 | Horrigan | ................ | G06Q 40/00 |
| | | | | 705/37 |
| 2004/0024692 A1* | 2/2004 | Turbeville | ............. | G06Q 40/08 |
| | | | | 705/38 |
| 2005/0080703 A1* | 4/2005 | Chiesa | ................... | G06Q 40/00 |
| | | | | 705/36 R |
| 2005/0124408 A1* | 6/2005 | Vlazny | .................. | G06Q 50/34 |
| | | | | 463/28 |
| 2008/0015871 A1* | 1/2008 | Eder | ...................... | G06Q 40/00 |
| | | | | 705/348 |
| 2009/0106140 A1* | 4/2009 | De La Motte | ......... | G06Q 20/10 |
| | | | | 705/37 |
| 2009/0307149 A1* | 12/2009 | Markov | ................. | G06Q 40/06 |
| | | | | 705/36 R |
| 2010/0088210 A1* | 4/2010 | Gardner | ................. | G06Q 40/03 |
| | | | | 705/35 |
| 2011/0119166 A1* | 5/2011 | Steinberg | ............... | G06Q 30/04 |
| | | | | 705/34 |
| 2012/0239453 A1* | 9/2012 | Osogami | ............... | G06Q 10/04 |
| | | | | 705/7.25 |
| 2012/0323753 A1* | 12/2012 | Norman | ................. | G06Q 40/00 |
| | | | | 705/37 |
| 2013/0275334 A1* | 10/2013 | Andersen | ............... | G06Q 40/06 |
| | | | | 705/36 R |
| 2014/0201110 A1* | 7/2014 | Sato | ...................... | G01R 21/133 |
| | | | | 705/412 |
| 2015/0058261 A1* | 2/2015 | Parikh | ................. | H04L 67/1001 |
| | | | | 705/412 |
| 2015/0310461 A1* | 10/2015 | Lee | ........................ | G06Q 10/04 |
| | | | | 705/412 |
| 2015/0363866 A1* | 12/2015 | Depew | ............... | G06Q 30/0633 |
| | | | | 705/26.8 |
| 2016/0117784 A1* | 4/2016 | Hwang | .............. | G06Q 30/0283 |
| | | | | 705/412 |
| 2016/0196521 A1* | 7/2016 | Wada | .................... | G06Q 50/06 |
| | | | | 705/7.25 |
| 2018/0074523 A1* | 3/2018 | Cantrell | .................. | B60L 53/55 |
| 2019/0057396 A1* | 2/2019 | Cui | ..................... | G06Q 30/018 |
| 2020/0027096 A1 | 1/2020 | Cooner | | |
| 2021/0117981 A1* | 4/2021 | Tian | ..................... | G06Q 30/018 |
| 2022/0358547 A1* | 11/2022 | Blaikie, III | ......... | G06Q 30/0261 |
| 2023/0048376 A1* | 2/2023 | Purandare | .......... | G06Q 20/3825 |

* cited by examiner

|  |  | Intermediate demand | | | | | | | Final demand | | | | Income (deduction) (C) | Total amount (A+B-C) |
|---|---|---|---|---|---|---|---|---|---|---|---|---|---|---|
|  |  | Agriculture, forestry and fishing | Mining | manufacturing | Electricity, Gas, Water | Construction | Service | Total intermediate demand (A) | Consumption | Export | Export | Total final demand (B) | Total demand (A+B) | | |
| Intermediate input | Agriculture, forestry and fishing | 18 | 0 | 254 | 0 | 2 | 29 | 304 | 125 | 1 | 7 | 134 | 438 | 55 | 383 |
|  | Mining | 0 | 0 | 355 | 65 | 4 | 0 | 424 | 0 | 2 | 1 | 3 | 427 | 400 | 26 |
|  | manufacturing | 85 | 3 | 3,240 | 37 | 370 | 670 | 4,405 | 1,004 | 746 | 3,677 | 1,927 | 8,082 | 1,609 | 6,473 |
|  | Electricity, Gas, Water | 1 | 1 | 100 | 36 | 2 | 72 | 211 | 103 | 0 | 103 | 1 | 316 | 1 | 315 |
|  | Construction | 0 | 0 | 3 | 10 | 0 | 77 | 90 | 0 | 901 | 903 | 2 | 993 | 1 | 993 |
|  | Service | 39 | 5 | 750 | 24 | 177 | 1,501 | 2,496 | 2,908 | 232 | 3,575 | 432 | 6,071 | 332 | 5,739 |
|  | Total intermediate input | 144 | 10 | 4,703 | 171 | 556 | 2,349 | 7,933 | 4,140 | 1,884 | 8,394 | 2,370 | 16,327 | 2,398 | 13,929 |
| Value added | Wage | 33 | 6 | 686 | 24 | 267 | 1,655 | 2,671 | | | | | | | |
|  | Operating surplus, etc. | 206 | 11 | 1,085 | 119 | 170 | 1,734 | 3,325 | | | | | | | |
|  | Total value added | 239 | 17 | 1,771 | 114 | 436 | 3,390 | 5,996 | | | | | | | |
|  | Total input | 386 | 26 | 6,473 | 315 | 993 | 5,739 | 13,929 | | | | | | | |

PLATFORM AND METHOD FOR CALCULATING PAYMENT, CONTRIBUTION, INVESTMENT AND DIVIDEND RETURN OF CARBON EMISSION CHARGES BASED ON BLOCKCHAIN

CROSS-REFERENCE TO RELATED APPLICATION

This application claims priority under 35 U.S.C. § 119 to Korean Patent Application No. 10-2021-0053986, filed on Apr. 26, 2021, in the Korean Intellectual Property Office (KIPO), the disclosure of which is incorporated by reference herein in its entirety.

TECHNICAL FIELD

The present disclosure relates to a platform and a method for calculating payment, contribution, investment and dividend return (including the principal amount of investment) of carbon emission charges based on a blockchain, and more particularly, to a platform and a method for calculating payment, contribution, investment and dividend return of carbon emission charges based on a blockchain, which is configured to provide consumers who desire to participate in climate change prevention actions with an opportunity to voluntarily pay and contribute an affordable share of the carbon emission charge for carbon emissions they emitted from their consumption of goods and services; to financially intermediate the voluntarily paid and contributed charges to be invested in climate change-related profitable green financial products; to return accrued dividend together with the principal investment in climate related financial products to the consumers who voluntarily paid an affordable amount of carbon emission charges according to the amount of carbon emission calculated based on their consumption of goods and services.

DISCUSSION OF RELATED ART

A Carbon Cashback Point System: In general, a carbon cashback system is a system that gives points that may be used like cash equivalent to the amount of carbon reduction to consumers who purchase products with high energy efficiency and low carbon emissions.

However, from the standpoint of a company that reduced carbon emissions, the company may expand the development and increase the production of low-carbon products based on the increased sales of carbon cashback products, but the company has to bear the extra costs of the accumulated carbon points which is about 0.5% of the product sales volume. Accordingly, companies are reluctant to participate in the carbon point system because they have to pay not only the double burden of the higher production costs required to produce energy-efficient, low-carbon emissions products but also the extra costs of carbon cashback points.

In addition, from the standpoint of consumers purchasing the energy-efficient, low-carbon emissions products, consumers should be able to earn carbon cashback points and use them like cash whenever they purchase energy-efficient, low-carbon emissions products. However, carbon points accumulation and use are limited to the subscribers to the existing carbon point card service providers even though it is important to expand the scope of the products and the numbers of shops participating in the carbon cashback point system.

In addition, there has been a problem in realizing the intended goal of the carbon cashback point system which is "the expansion of the action program for wider public participation" through the change of consumption pattern towards low carbon and energy-efficient products due to the limited number of participating companies owing to the extra burden on the company.

In addition, the conventional carbon point system is a system in which an amount of savings of electricity, gas, and water consumption in houses and commercial buildings is changed into a carbon emissions reduction amount which could be translated into points as an incentive which could be rewarded through the carbon point program website of the local government that participates in the carbon emission reduction practice program.

However, the carbon point system based on the savings of electricity, water, and gas consumption are limited to houses and commercial buildings, incentives may thus be applied only to those who actually pay the bill. Accordingly, it is difficult to induce wide and diverse consumer participation. In addition, compensation of the carbon point system was not sufficient to practically function as a compensation system applicable to everyone, as it is compensated in the form of apartment maintenance fees, transportation cards, parking tickets, garbage bags, and culture gift vouchers. Accordingly, the need for a practical and efficient system to secure nation-wide consumer participation and versatility of incentive scheme which are key elements in the carbon cashback and carbon point system is being raised.

As a prior document on a carbon emissions reduction system using block chain technology to reduce carbon emissions as described above, Patent No. 10-1914576 (registered on Oct. 29, 2018) relates to applying predetermined restrictions on a proof-of-work (POW) attempted immediately after a previous proof-of-work to alleviate competition for the POW between nodes.

However, this invention adopts a POW method and thus does not fundamentally solve disadvantages of the POW method.

A proof-of-stake (POS) method which has been proposed as an alternative of the POW method is a consensus algorithm to give the right to create a new block based on the stake. The right to create a new block may be expressed in coinage, and such coinage may be calculated by stake×time (a product of stake and time). In such a case, the stake means a stake owned by a node belonging to a blockchain network, that is, an amount of cryptocurrency owned/an amount of total cryptocurrency. In addition, time continuously increases, but if a certain node creates a new block, the time is set to '0' at that point and then increases again.

Accordingly, according to the POS method, each node generally creates a new block with a probability according to the size of its stake. A node that creates a new block according to the POS method will receive a newly issued cryptocurrency in the form of interest on the stake as a reward.

This POS method has an advantage of being able to belong to the blockchain network although it does not have strong computational power, that is, it may address the problem of unnecessary spec competition and energy waste of equipment, but there is a downside in that it is weak in securing a large number of participants due to the nature of the algorithm.

SUMMARY

Embodiments of the present disclosure is intended to solve the problems identified above by calculating carbon emissions according to consumers' consumption activities and providing the individual consumers with the opportunities to recognize that individual consumers are the contributers to climate changes and the opportunities to voluntarily pay and contribute carbon emission charges according to the amount of the carbon emissions they emitted on a monthly basis. Embodiment of the present disclosure is directed to a blockchain based platform and a method for calculating payment, contribution, investment and dividend return for carbon emission charges which could provide consumers with an opportunity to voluntarily participate in climate change response actions and climate financing activities.

Embodiments of the present disclosure may be further directed to a platform and a method for calculating payment, contribution, investment and dividend return of carbon emission charges based on a blockchain which enables easy participation of general consumers in green climate finance and promotes popularization of the green climate financing by showing carbon emissions that were emitted by each individual consumers and the market price per unit ton of carbon to the consumers who are willing to participate in climate change response actions, thus providing the customers the opportunity to be aware of the carbon emission charges they could pay and contribute and the opportunity to voluntarily choose to pay or contribute an affordable amount chosen by each individual consumers by providing the consumers with a financial intermediating service that could make the voluntarily paid and contributed charges are invested in climate related green financial products.

Embodiments of the present disclosure may be further directed to a platform and a method for calculating payment, contribution, investment and dividend return of carbon emission charges based on a blockchain which intermediate voluntarily paid carbon emission charges to be invested in profitable climate financial products such as carbon credits, green bonds, and green funds, and climate change projects such as wind power and solar power, and returns the principal investment and dividend accrued from the investments of voluntarily paid carbon emission charge can provide a strong incentive to consumers to voluntarily pay and contribute the carbon emission charges, as the good will for contributing to the climate change finance is eventually repaid with economic return, thus encouraging and sustaining the willingness of consumers to voluntarily pay the affordable amount of carbon emission charges.

According to the present embodiment, a platform for calculating payment, contribution, investment and dividend return of carbon emission charges/contributions based on a blockchain includes: a financial institution server configured to provide transactions details data in response to a data search on purchase details based on user's on-line based consumption of goods and services; a carbon pay server connected to the financial institution server and a customer terminal through a network; and the customer terminal in which an application is installed, wherein the application displays consumption patterns/results based on the transactions details according to user's purchases, the carbon emissions according to the transactions details, and real time market price of the carbon emission charges and provides related information about tips and actions necessary to reduce carbon emissions.

In some embodiments, the carbon pay server may collect crawled data by crawling only desired information based on the user's transaction details data provided from the financial institution server.

In some embodiments, in the crawling, information classified into credit card transactions details, check card purchase details, and cash payment details used by the user may be collected as the crawled data.

In some embodiments, in the crawling, at least one of a collector including at least one of Logstash and fluented or a message queuing (MQ) including at least one of kafka and RabbitMQ may be used to perform streaming to collect the crawled data.

In some embodiments, in the streaming, at least one of storm, flink, and spark streaming may be used to process the transactions details data.

In some embodiments, the algorithm may calculate the carbon emissions coefficient per monetary value for each industry category by using industrial categorization classified in industrial Input-Output Table (ex. published by the Central Bank), energy use statistics by (domestic) industry, and IPCC carbon emission coefficients for each energy source. The carbon emission coefficient for each industry category may be calculated by matching it with transactions details data of consumers to calculate the carbon emissions according to the list of consumption items.

In some embodiments, the carbon pay server may include system for displaying real time investment portfolio information on the customer terminal and for returning the principal investment and its dividend in proportion to the investment when earnings are generated from the voluntary payment invested by the user from the investment products that accrue dividend and proceeds.

According to an embodiment, a method for calculating payment, contribution, investment and dividend return of carbon emission charges/contributions based on a blockchain includes: requesting data inquiry including user's transactions details data from a financial institution server through a network; crawling the user's transaction details data in the financial institution server so that a carbon pay server receives the user's transaction details data; calculating, through an algorithm, a result value including carbon emissions, a consumption pattern, and voluntary carbon emission charges/contributions based on the crawled user's transaction details data; transmitting the result value for the carbon emissions, the charges/contributions, and the consumption pattern calculated in the carbon pay server to a customer terminal through the network; and when a user pays the charges/contributions to a financial product according to the carbon emissions amount displayed, financially intermediate the paid charges/contributions to be invested into climate related financial products and displaying, on the customer terminal, dividend accrued from the financial products invested and return the principal investment and its dividend accrued when requested by the user who paid the voluntary carbon emission charges based on the carbon emission amount calculated displayed by the carbon pay server.

As set forth hereinabove, the present disclosure has effects of providing consumers who desire to participate in activities to cope with the climate change with an option of voluntarily paying charges and contributions for carbon emission charges of each individual consumers, thus providing a tool in which they may become the driver of climate financing actions.

The present disclosure has effects of allowing an application (e.g., APP) user to choose to invest in a variety of profitable climate investment and financing products (e.g., European and Korean carbon credits, green bonds, solar power projects, wind power projects, tree planting) and to contribute donations to non-profitable contributions for NGO(Non-Governmental Organizations)s like Green Peace, WWF etc.

The present disclosure has effects of raising awareness of voluntary participation by making consumers aware of their consumption activities directly trigger climate change by demonstrating carbon emissions from their consumption activities and by calculating carbon emission charges/contributions based on a carbon emission coefficient by industry category (ton $CO_2$/per monetary value) based on industrial Input-Output Table, energy consumption by industry, and IPCC carbon emission coefficients for each energy source through an algorithm, and the calculated carbon emissions and charges/contributions are displayed on their mobile App.

The charges/contributions of the present disclosure are distributed and stored on multiple computers and is used through a blockchain network, a safe and transparent means that cannot be forged or tampered with, thereby improving security and reliability for users.

The present disclosure has effects of creating a virtuous cycle structure that increases consumers' voluntary participation and willingness to pay/contribute through a process in which voluntary payments are financially intermediated into various types of climate related investment options and return the principal investment and its dividend accrued to the users whenever they wish to withdraw the dividend accrued as well as the principal investment.

DETAILED DESCRIPTION

It should be noted that the technical terms used in the present disclosure are used only to describe specific embodiments, and are not intended to limit the present disclosure, and the technical terms used in the present disclosure should be interpreted in a meaning generally understood by those of ordinary skill in the art to which the present disclosure belongs and should not be interpreted in an overly comprehensive sense or in an excessively reduced meaning, unless specifically defined in other meanings in the present disclosure.

In addition, when the technical term used in the present disclosure is an incorrect technical term that does not accurately express the spirit of the present disclosure, it should be understood by being replaced with a technical term that may be correctly understood by those skilled in the art. In addition, general terms used in the present disclosure should be interpreted as defined in advance or according to the context and should not be interpreted in an excessively reduced meaning.

In addition, the singular expression used in the present disclosure includes a plural expression unless the context clearly indicates otherwise. For example, terms such as "consisting of" or "comprising" should not be construed as necessarily including all of various elements or several steps described in the present disclosure, and it should be construed that some of the elements or some steps may not be included or additional elements or steps may further be included.

Hereinafter, a platform and a method for calculating payment, contribution, investment and dividend return of carbon emission charges based on a blockchain will be described.

A platform for calculating payment, contribution, investment and dividend return of carbon emission charges/contributions based on a blockchain includes a financial institution server configured to provide transaction details data in response to a data inquiry request including transaction details based on user's personal consumption of goods and services; a carbon pay server connected to the financial institution server and a customer terminal through a network, and configured to calculate carbon emissions according to the user's transaction details data provided from the financial institution server, calculate charges/contribution, and analyze a consumption pattern through an algorithm, and transmit, to the customer terminal, information on the carbon emissions, the charges/contribution, and the consumption pattern, information related to carbon emission reductions, and data on profitability of climate related investment products based on the analyzed information; and the customer terminal in which an application is installed that displays consumption patterns/results based on the transaction details according to user's purchases, carbon emissions according to the list of consumption details, charges/contributions according to the carbon emissions, and informations and tips related with carbon emission reduction activities.

Figure 1:
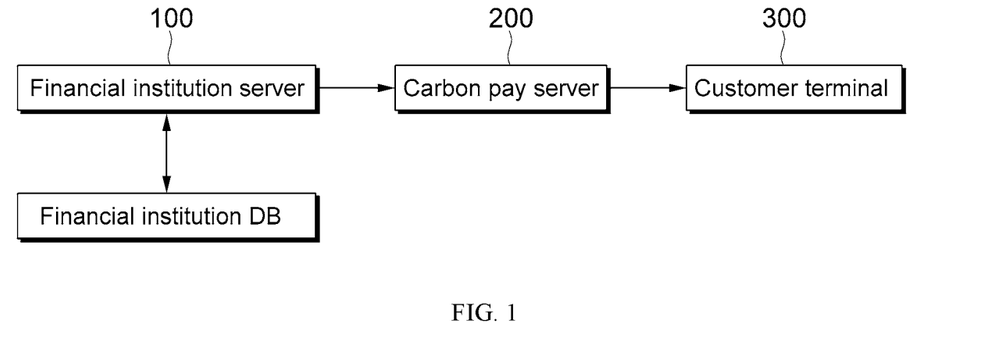
FIG. 1 is a view illustrating a blockchain-based carbon emission charge calculation platform according to an embodiment of the present disclosure.
Figure 2:
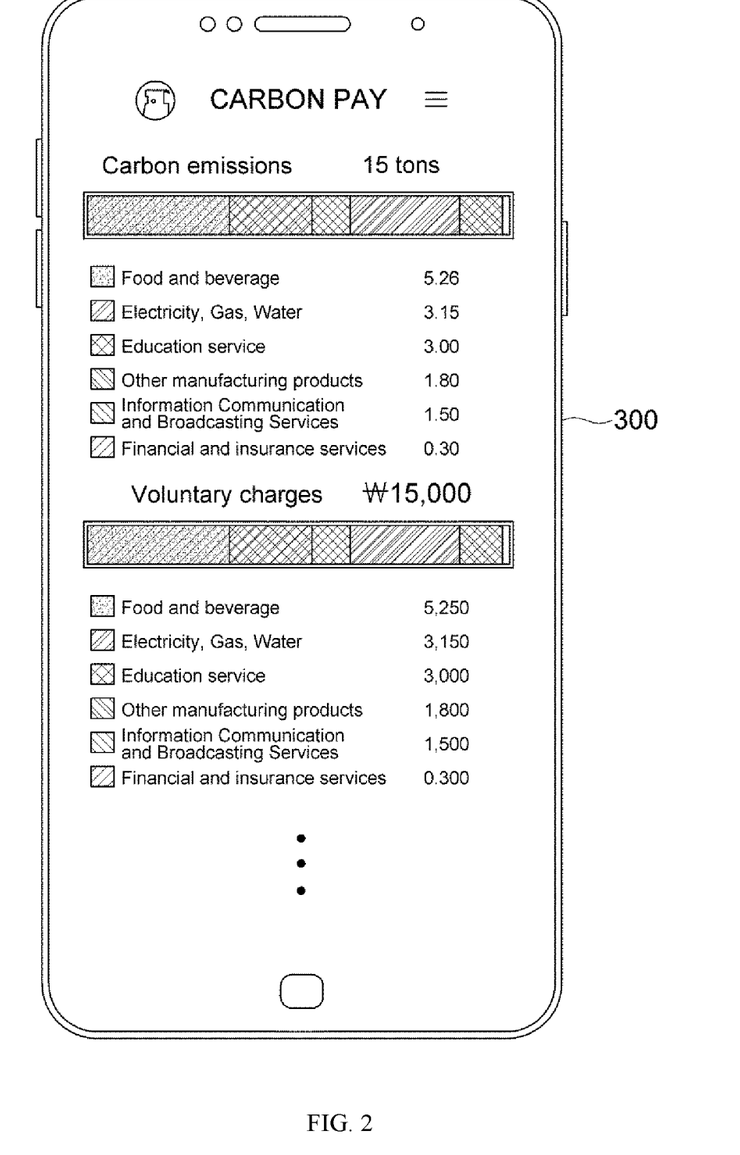
FIG. 2 is a view illustrating a state in which carbon emissions and charges are displayed in a customer terminal of the blockchain-based carbon emission charge calculation platform according to an embodiment.
Figure 3:
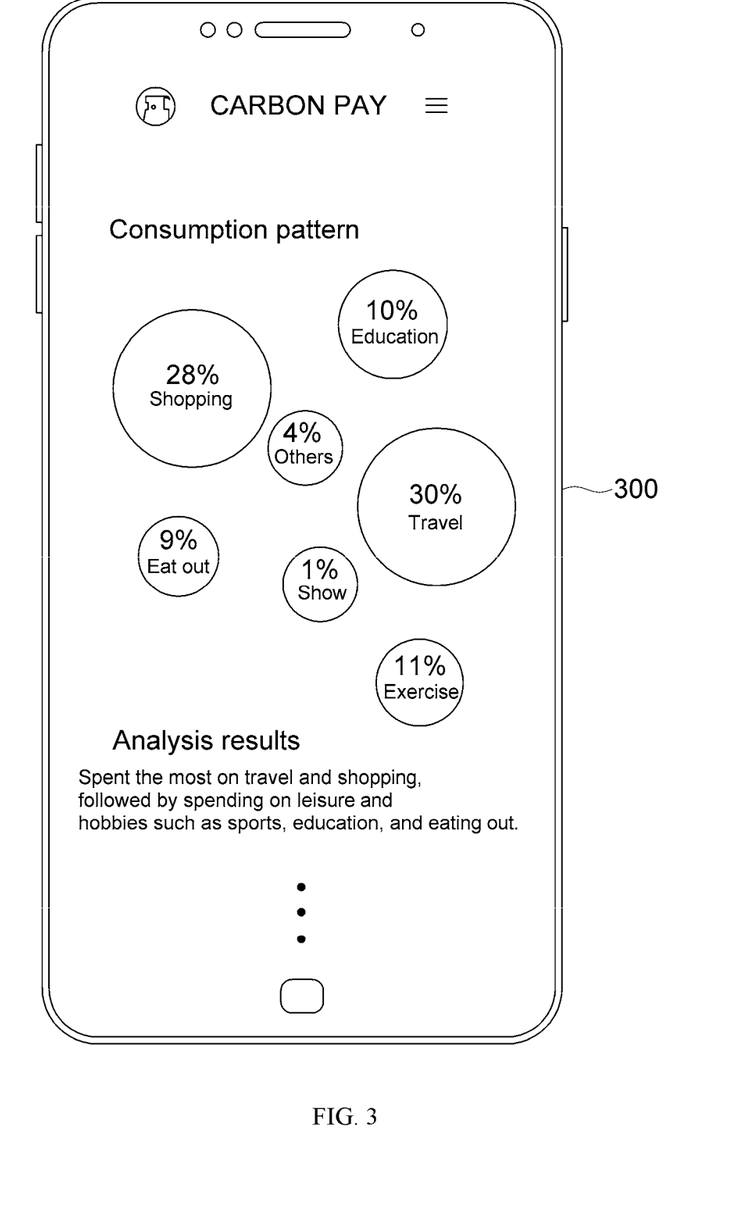
FIG. 3 is a view illustrating a state in which a customer's consumption pattern and analysis results are displayed in the customer terminal of the blockchain-based carbon emission charges/contributions calculation platform according to an embodiment.
Figure 4:
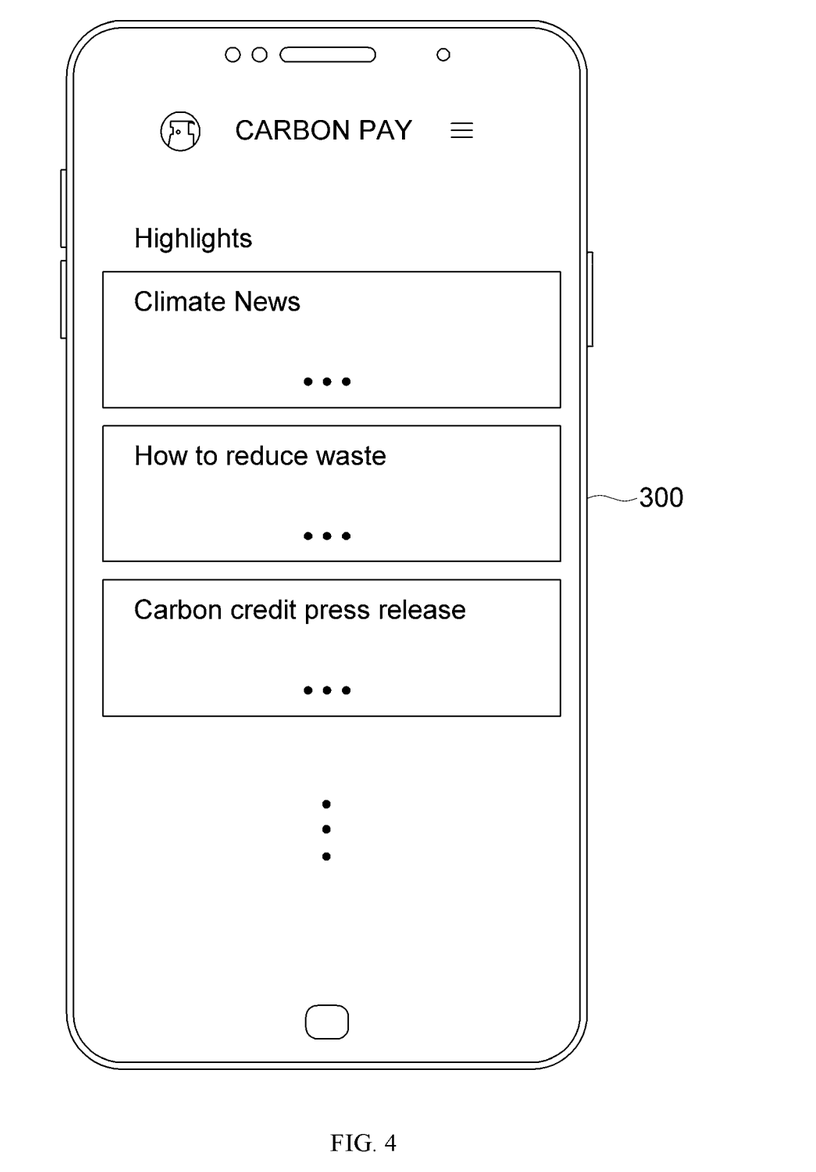
FIG. 4 is a view illustrating a state in which information on reducing carbon emissions is displayed on the customer terminal of the blockchain-based carbon emission charges/contributions calculation platform according to an embodiment.
Figure 5:
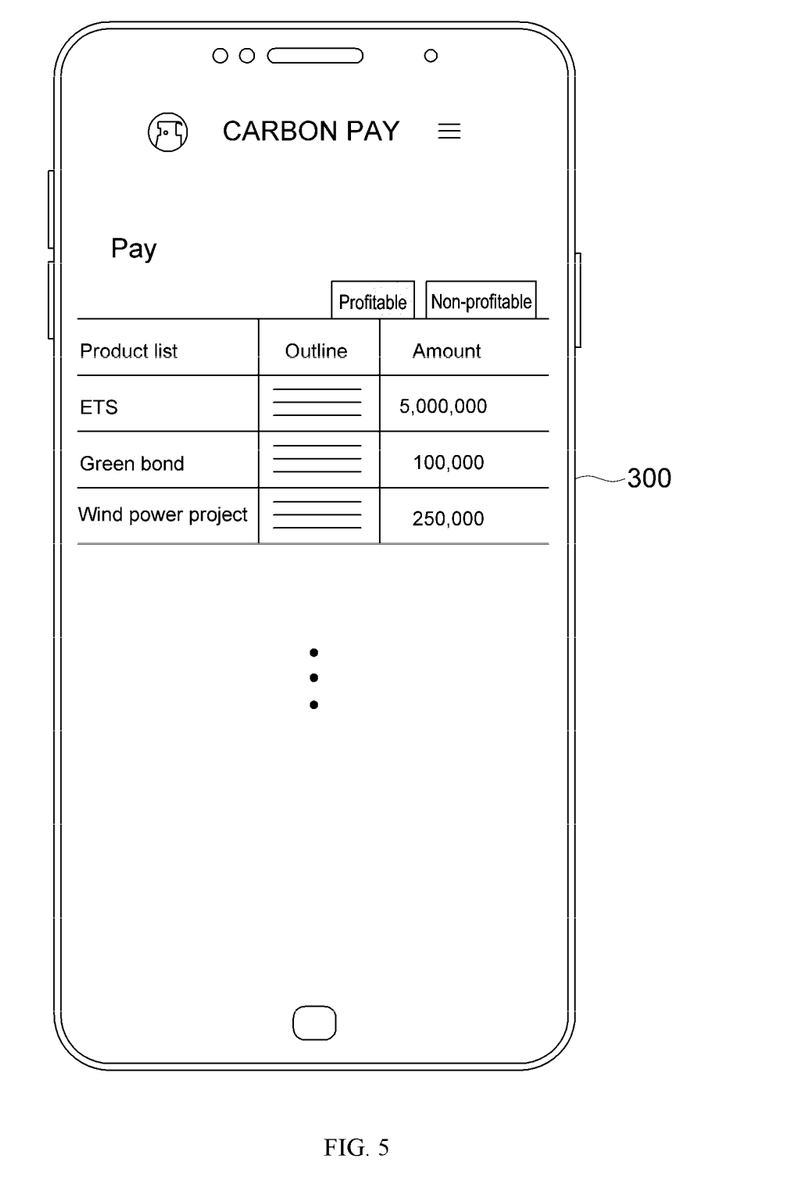
FIG. 5 is a view illustrating a state of checking profitable and non-profitable amounts of financial products invested with the charges/contributions on the customer terminal of the blockchain-based carbon emission charge calculation platform according to an embodiment.
Figure 6:
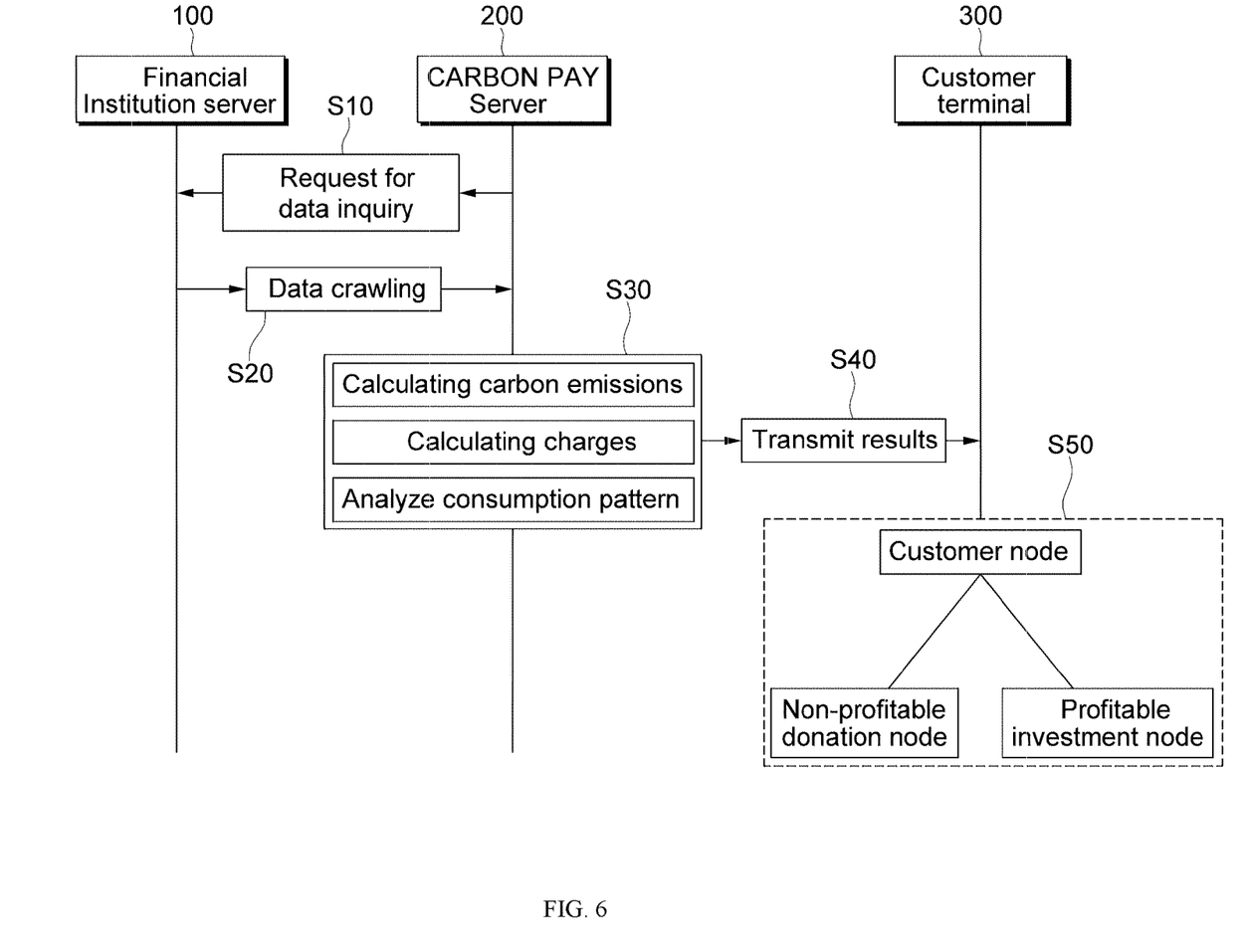
FIG. 6 is a flowchart illustrating a calculating method of the blockchain-based carbon emission charges/contributions calculation platform according to an embodiment.

The platform and method for calculating payment, contribution, investment and dividend return of carbon emission charges/contributions based on a blockchain characterized as described above will be described in detail with reference to the accompanying drawings, FIG. 1 is a view illustrating a blockchain-based carbon emission charge calculation platform according to an embodiment of the present disclosure, FIG. 2 is a view illustrating a state in which carbon emissions and charges are displayed in a customer terminal of the blockchain-based carbon emission charge calculation platform according to an embodiment, FIG. 3 is a view illustrating a state in which a customer's consumption pattern and analysis results are displayed in the customer terminal of the blockchain-based carbon emission charges/contributions calculation platform according to an embodiment, FIG. 4 is a view illustrating a state in which information on reducing carbon emissions is displayed on the customer terminal of the blockchain-based carbon emission charges/contributions calculation platform according to an embodiment, FIG. 5 is a view illustrating a state of real time status of profitable and non-profitable amounts of financial products invested with the charges/contributions on the customer terminal of the blockchain-based carbon emission charge calculation platform according to an embodiment, and FIG. 6 is a flowchart illustrating a calculating method of the blockchain-based carbon emission charges/contributions calculation platform according to an embodiment.

Referring to FIGS. 1 to 6, the platform for calculating payment, contribution, investment and dividend return of carbon emission charges/contributions based on a blockchain according to an embodiment includes a financial institution server 100, a carbon pay server 200, and a customer terminal 300.

The financial institution server 100 may include a credit card company and the like, and when there is a data inquiry request (S10), the financial institution server 100 provides transaction details data including credit card transaction details, check card transaction details, cash payment details, and the like based on user's personal consumption of goods and services. The financial institution server 100 includes a financial institution DB for storing individual transactions details (credit card, check card, cash, and the like), and providing data upon request of the carbon pay server 200 for the information of individual consumers. The financial institution server 100 is connected to the carbon pay server 200 through a network including the Internet network or a mobile communication network.

The carbon pay server 200 is a software component that controls the platform overall and serves a function of requesting for and receiving data from an external client server (e.g., financial institution server 100) and a function of receiving and responding to requests of an external client (e.g., customer terminal 300).

The carbon pay server 200 executes a data inquiry request (S10) to retrieve transaction details data from the financial institution server 100 based on user personal consumption of goods and services associated with the customer terminal 300, and crawls (S20) desired data from among the transactions details data to collect crawled information. Crawling (S20) collects documents distributed and stored in countless computers and includes them as an index of a search target.

In the crawling (S20), a collector such as logstash, fluentd, and the like and MQ (Message Queuing) such as kafka, rabbitMQ, and the like may be used to collect streaming data (e.g., crawled information), and spark streaming, storm, flunk, and the like may be used to process the transaction details data and/or the streaming data. Programming is required to build an environment for collecting the data, and languages such as python, scala, and java may be used.

The information (e.g., crawled information) collected by the crawling (S20) may include information related to the user transaction details, for example, customer ID, card payment history, cash receipt issuance record, tax invoice, and the like, but embodiments are not limited thereto.

When the information collected by the crawling (S20) is obtained, the carbon pay server 200 calculates the carbon emissions and a charge amount through an algorithm (S30) according to an embodiment based on the collected information. The algorithm (S30) calculates an amount of carbon emissions for the consumption amount (e.g., $kgCO_2$/monetary value), and calculates a result value by calculating a voluntary carbon emission charge/contribution.

The customer terminal 300 may download and install an application provided by the carbon pay server 200 from an app store (e.g., google store). As illustrated in FIGS. 2 to 5, the application installed in the customer terminal 300 displays consumption patterns/results based on the transaction details according to the users' purchase, displays the carbon emissions according to the purchasing details, displays charges/contributions according to the carbon emissions, and provides information and tips related to carbon emission reduction activities.

In addition, the application may display the portfolio of financial products invested by the charges/contributions voluntarily paid by the consumer, and may also display the details of the donations for non-profitable contributions. The portfolio of financial products for profitability and donations for non-profitable contributions may be selectively displayed on the customer terminal 300 according to the user's choice in the application.

Hereinafter, the process of calculating and choosing an amount of voluntary payment of carbon emission charges according to the amount of carbon emissions by using the platform for calculating payment, contribution, investment and dividend return of carbon emission charges/contributions based on a blockchain will be described.

Figure 7:
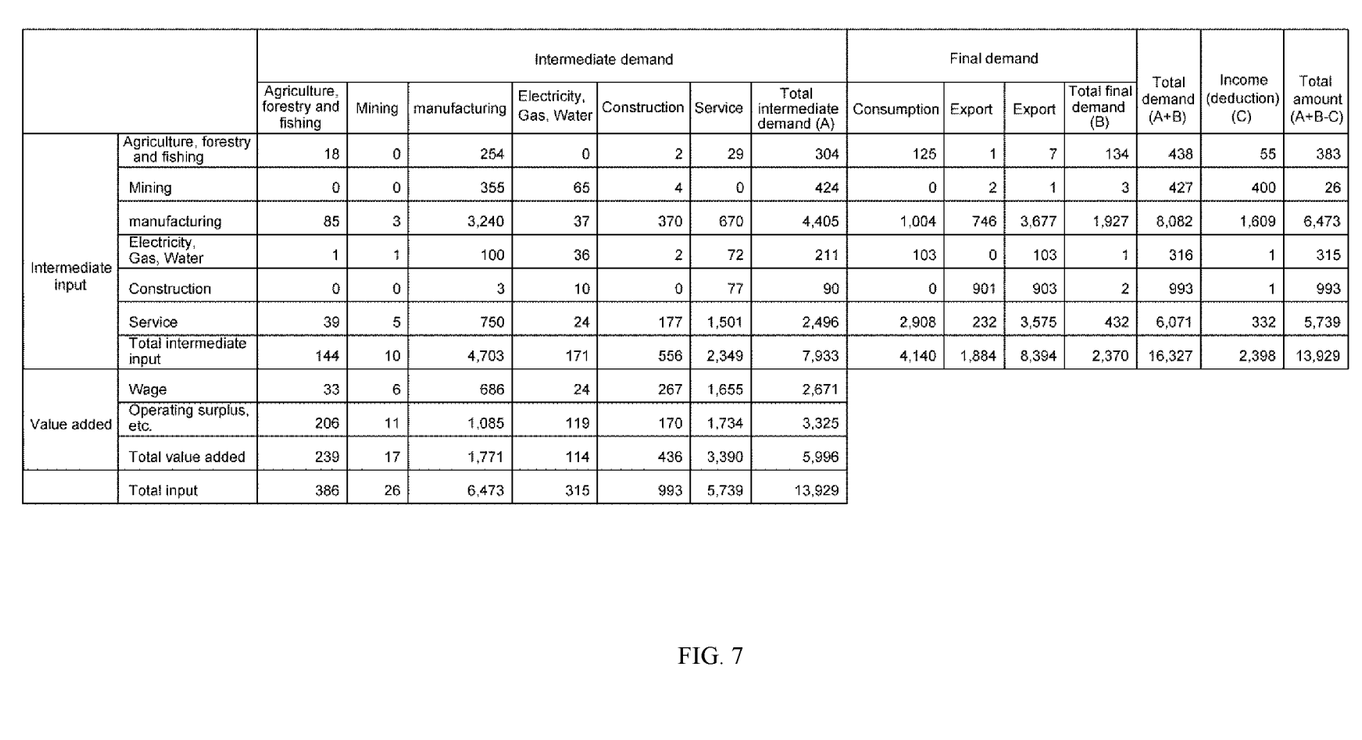
FIG. 7 is an Industrial Input-Output Table showing economic activities by industry classified into large, medium and small criteria to calculate carbon emissions through a calculating method of the blockchain-based carbon emission charges/contributions calculation platform according to an embodiment.

First, an industrial Input-Output Table<IOT> provided by the Central Bank provides the primary data necessary to identify the input and distribution structure of industry. The Input-Output Table is a comprehensive statistical table that records all transaction details related to production and disposal of goods and services occurring in the national economy for a certain period (usually one year) according to certain principles and formats, indicating the economic activity of the industry. Thus it can be used to estimate carbon emissions in each industry.

In FIG. 7, illustrates an example of the structure of the industrial Input-Output Table. The Input-Output Table is composed of 30 industries in large categories, 82 industries in medium categories, and 384 industries in small categories. The process of calculating direct and indirect carbon emission per raw unit for each industry can be performed based on the Input-Output Table, statistical data on energy consumption by each industry, and IPCC carbon emission coefficients of specific energy source. The carbon emission coefficient of each industry is expressed by Equation 1 below. In order to identify the changes in greenhouse gas emission, a greenhouse gas emission coefficient can be decomposed into an energy consumption efficiency (energy input per output unit) and a greenhouse gas emission coefficient of an input energy (greenhouse gas emission per energy unit) (see Equation 1 below).

$$\text{Carbon emission coefficient by industry } (p, \text{ton CO2 per monetary value}) = \qquad [\text{Equation 1}]$$

-continued $$\frac{\text{Carbon emissions quantity}(G)}{\text{output quanity}(X)} =$$

$$\frac{\text{Energy Input}(E)}{\text{output quantity}(X)} = \frac{\text{Carbon emission quantity}(G)}{\text{energy input }(E)}$$

The above process performs: requesting data search for user's transaction details from the financial institution server (100) through a network (S10); receiving the user's transaction details data (S20) and storing them in the carbon pay server (200) by crawling the user's transaction details data form the financial institution servers 100; transmitting carbon emission amount, consumption pattern, and potential carbon emission charges/contributions calculated by an algorithm based on the crawled transaction data (S30); transmitting a result value of the carbon emission amount, the charges/contributions, and the consumption pattern analyzed in the carbon pay server 200 to the customer terminal through the network (S40); and displaying the data about the dividend from the voluntary carbon emission charges invested in financial products on the customer terminal (S50).

Figure 8:
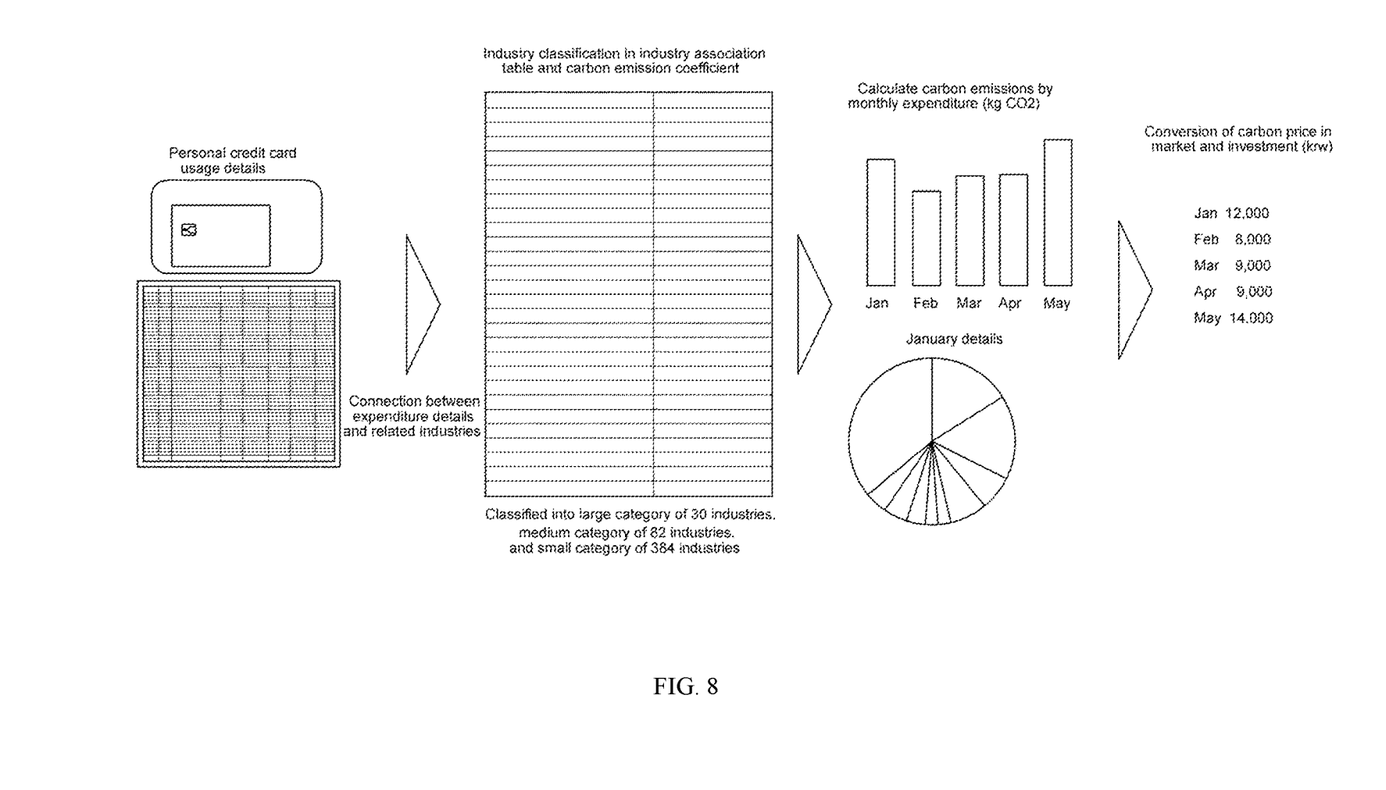
FIG. 8 is a view illustrating a sequence of an algorithm to calculate carbon emissions based on a carbon emission coefficient (ton $CO_2$/per monetary value or Kg $CO_2$/per monetary value) for each industry based on Industrial Input-Output Table, energy consumption by industry, and IPCC carbon emission coefficients for each energy source through the calculating method of the blockchain-based carbon emission charge calculation platform.

As illustrated in FIG. 8, the user's consumption items (e.g., consumption items related to the transaction details data) may be matched to each category of industry (e.g., 30,000 Korean won of using public transportation bus fare is classified as the transportation industry) based on the Input-Output Table. In addition, by using the carbon emissions unit for each item (e.g., the carbon emission coefficient for the transportation industry is 0.009 ton $CO_2$/10,000 Korean won) calculated based on energy use by each industry category and the IPCC carbon emission coefficient for each energy source, the user's transaction details data and carbon emissions may be matched, and accordingly, an amount of carbon emissions according to an amount of expenditure (in the case above, 0.009 ton $CO_2$/10,000 won× 30,000 won=0.027 ton $CO_2$) may be obtained.

For the carbon emissions calculation, an object-oriented language for data analysis may be used, for example, the language may be R, SAS, SPSS, and the like, but embodiments are not limited thereto, and any software capable of performing the calculation may be used. Daily, weekly, monthly or annual carbon emissions and charges are calculated by the above equation.

When the calculation of the charges according to the carbon emissions is completed, the carbon pay server 200 transmits a screen image including the corresponding information to the application installed in the corresponding customer terminal 300. The transmission is performed through the application installed in the customer terminal 300, and may be performed through other information and communication media (e.g., website, SNS text message).

In addition, the user of carbon pay server may obtain the consumption pattern analysis data and the calculated carbon pay contribution amount according to the amount of carbon emissions through the application installed in the customer terminal 300 or other information and communication media.

The consumer may choose an amount for voluntary payment of carbon emission charges for profitable investment in climate related financial products and select an amount for contribution to non-profitable donations by using the customer terminal 300 based on the corresponding information. Information in the screen image displayed on the customer terminal 300 may include carbon emissions, calculated carbon pay contributions, currency exchange functions, deposit functions, withdrawal functions, investment target options, consumption pattern analysis results, climate and environment-related news and notices, investment management functions, and the like, and by using this, consumer users may choose the desired investment options through display UX/UI.

The amount paid may be exchanged into cryptocurrency, and information on the exchanged cryptocurrency (e.g., amount information) is shared through a new block created in the blockchain network. The amount information generated by the blockchain network is shared with all blockchain users and may be transacted in the form of cryptocurrency. The types of cryptocurrencies used in the trading market may include Bitcoin (BTC), Ethereum (ETH), Ripple (XRP), Tether (USDT), Eos (EOS), Litecoin (LTC), Bitcoin cash (BCH), Chainlink (LINK), Binance coin (BNB), Libra, and the like, and if there is a newly listed coin, it may be added to practice the present disclosure.

However, since the above-mentioned coins have a problem of high investment uncertainty due to their extreme volatility, it is most desirable to use a 'stablecoin' which is a cryptocurrency designed to minimize price volatility. Stablecoins are typically designed so that 1 coin is worth 1 dollar. UDST, BUSD, USDC, DAI, and the like may be used as stablecoins for carrying out the present disclosure, and if there is a newly listed stablecoin, it may be added to practice the present disclosure.

The carbon pay server 200 may display investment transaction information on the customer terminal 300 in real time. The carbon pay server 200 and/or the platform may include a system for returning the principal investment and dividend from investment in financial options in proportion to the amount of investment when earnings generated from the voluntary carbon emission payment invested by the user in a climate related financial products. In addition, gift giving may be also possible by providing a certain amount of cryptocurrency to acquaintances equivalent to the amount paid. In addition, the carbon pay server 200 and/or the platform may include a system for transferring a ratable portion of the voluntary carbon emission payments and investment earnings to a platform manager in the form of commission.

Nodes illustrated in FIG. 6 may serve the roles such as verification, approval, and storage for decentralization of the blockchain without a central administrator or a server, and become the basis for supporting the blockchain. To this end, the node has the following functions.

The functions of the node may include a wallet function of generating and confirming a transaction with an identified address, a function of decrypting by using a computer to obtain the right to create a block, and a mining function of receiving coins in return. The node has all the blocks. The node may further include a function as a full blockchain that may be independently verified, may verify and approve transactions and blocks, and may serve P2P network transmission. Such a node maintains a relationship with other nodes through a network using the aforementioned functions.

Accordingly, all transaction information of related investments and earnings, among a customer node, a non-profit contribution options node and a profitable investment options node are shared in the blockchain network.

As described above, the present disclosure provides individual consumers who want to participate in actions to cope with climate changes with an option to voluntarily pay carbon emission charges of each individual by financially intermediating voluntary carbon emission payments into climate related financial investment products, thereby providing a tool in which users may become the active participants in climate financing. In other words, users may invest or contribute their voluntary charges/contributions for carbon emissions in various practical climate investment options they choose (e.g., carbon credits in Europe and Korea, green bonds, solar power projects, wind power projects, tree planting, donations to NGOs like Green Peace, WWF).

In an embodiment, the present disclosure may calculate carbon emissions and charges based on the carbon emission coefficient per monetary value (ex. Won <Korean Currency unit>) for each industry category by using an algorithm, and present them through mobile APP.

Accordingly, the present disclosure allows consumers and users to recognize that their consumption activities directly trigger climate changes, thus encourages the voluntary participation to climate actions of the consumers and users. In addition, the charges/contributions may be securely stored on multiple computers and managed through the blockchain network which is a safe and transparent means that cannot be forged or tampered with, so that the security and reliability of the charges/contributions may be enhanced.

In addition, the present disclosure has the advantage of creating a virtuous cycle structure that provides incentives for consumers' voluntary participation and willingness to pay by offering a process in which voluntary payment of carbon emission charges are financially intermediated into climate related investment options and the principal investment and generated dividend are returned to the users.

While this specification contains numerous specific implementation details, these are not to be construed as limitations on the scope of any invention or claim, but rather as descriptions of features that may be specific to particular embodiments of particular inventions.

The embodiments of the present disclosure disclosed in the present specification and drawings are merely presented as specific examples to aid understanding and are not intended to limit the scope of the present disclosure. It will be apparent to those of ordinary skill in the art to which the present disclosure pertains that other modifications based on the technical spirit of the present disclosure may be implemented in addition to the embodiments disclosed herein.

What is claimed is:

1. A platform system for calculating payment, contribution, investment and dividend return of carbon emission charges/contributions based on a blockchain, the system comprising:
    a financial institution server comprising: a hardware memory storing a financial institution database storing transaction details data; and a hardware processor configured to provide the transaction details data to external devices through a network including an Internet network or a mobile communication network, in response to a data inquiry request including consumption details based on user's on-line based purchase of goods and services, from the external devices;
    a carbon pay server connected to the financial institution server and a customer terminal through the network, and comprising a hardware processor configured to analyze, through an algorithm, carbon emissions, charges/contributions, and a consumption pattern according to the transaction details data of the user provided from the financial institution server, and transmit, to the customer terminal, information on the carbon emissions, the charges/contributions, and the consumption pattern and informations and tips related to carbon emission reduction activities to facilitate low carbon lifestyle change,
    wherein the hardware processor of the carbon pay server is further configured to collect, over the network, crawled information by crawling only desired information based on the user's transaction details data provided from the financial institution server;
    the customer terminal in which an application is installed, wherein the customer terminal comprising a hardware processor configured to display, on a screen of the customer terminal, consumption patterns/results based on the transaction details data according to user's purchases, the carbon emissions according to the consumption details, and charges according to the carbon emissions and provides the informations and tips related to carbon emissions reduction activities; and
    a customer node device, a non-profit contribution options node device, and a profitable investment options node device, which are connected through a blockchain network and configured to share transaction information of investments and earnings each other,
    wherein the customer node device, the non-profit contribution options node device, and the profitable investment options node device are configured to:
        perform functions including a wallet function of generating and confirming a transaction with an identified address, a function of decrypting by using a computer to obtain right to create a block, and a mining function of receiving coins in return; and
        verify and approve transactions and blocks, and perform P2P network transmission.

2. The platform of claim 1, wherein in the crawling, information classified into credit card transaction details, check card purchase details, and cash payment details used by the user is collected as the crawled information.

3. The platform of claim 1, wherein in the crawling, at least one of a collector including at least one of Logstash and fluentd or a message queuing (MQ) including at least one of kafka and RabbitMQ is used to perform streaming to collect the crawled information.

4. The platform of claim 3, wherein in the streaming, at least one of storm, flunk, and spark streaming is used to process the transaction details data.

5. The platform of claim 1, wherein the algorithm calculates a carbon emission coefficient per monetary value for each industry category by using industrial categorization classified in Input-Output Table, energy use statistics by industry, and IPCC carbon emission coefficients for each energy source, and calculates carbon emissions by matching the user's transaction details data to the corresponding classified industry.

6. The platform of claim 1, wherein the carbon pay server comprises a system for displaying investment transaction information on the customer terminal in real time and for returning dividend in proportion to the investment when earnings are generated from the voluntary carbon emission charge payment invested by the user in an investment options that accrue dividend and proceeds.

7. A method for calculating payment, contribution, investment and dividend return of carbon emission charges/contributions based on a blockchain, performed by a platform system including a financial institution server, a carbon pay server, a customer terminal, a customer node device, a non-profit contribution options node device, and a profitable investment options node device, the method comprising:

requesting, by the carbon pay server, data inquiry comprising user's transaction details data to the financial institution server through a network including an Internet network or a mobile communication network;

crawling and transmitting, by the financial institution server, the user's transaction details data;

receiving, by the carbon pay server, the user's transaction details data;

calculating, by the carbon pay server, through an algorithm stored in the carbon pay server, a result value comprising carbon emissions, a consumption pattern, and voluntary carbon emission charges/contributions based on the crawled user's transaction details data;

transmitting, by the carbon pay server, the result value for the carbon emissions, the charges/contributions, and the consumption pattern calculated in the carbon pay server to the customer terminal through the network;

when a user pays the charges/contributions to a financial product according to the result value, managing, by the customer terminal, the paid charges/contributions in a form of a portfolio of investment and displaying, on the customer terminal, data of the principal investment and dividend return from the invested climate related financial product;

sharing, by the customer node device, the non-profit contribution options node device, and the profitable investment options node device, which are connected through a blockchain network, transaction information of investments and earnings;

performing, by the customer node device, the non-profit contribution options node device, and the profitable investment options node device, functions including a wallet function of generating and confirming a transaction with an identified address, a function of decrypting by using a computer to obtain right to create a block, and a mining function of receiving coins in return; and verifying and approving, by the customer node device, the non-profit contribution options node device, and the profitable investment options node device, transactions and blocks, and performing P2P network transmission.

8. The method of claim 7, wherein the charges/contributions are exchanged to a blockchain-based cryptocurrency and returned to the user.

9. The method of claim 7, wherein the carbon pay server collects crawled information by crawling only desired information based on the user's transaction details data provided from the financial institution server.

10. The method of claim 7, wherein in the crawling, information classified into credit card transaction details, check card purchase details, and cash payment details from the user is collected as the crawled information.

11. The method of claim 7, wherein in the crawling, at least one of a collector including at least one of Logstash and fluentd or a message queuing (MQ) including at least one of kafka and RabbitMQ is used to perform streaming to collect the crawled information.

12. The method of claim 11, wherein in the streaming, at least one of storm, flink, and spark streaming is used to process the transaction details data.

13. The method of claim 7, wherein the algorithm calculates the carbon emissions according to consumption and transactions by matching the user's transaction details data to a related corresponding industry category classified in Input-Output Table.

* * * * *